US012638351B2

(12) United States Patent
Klaasse et al.

(10) Patent No.: US 12,638,351 B2
(45) Date of Patent: May 26, 2026

(54) JUNCTION-ISOLATED SEMICONDUCTOR STRAIN GAUGE

(71) Applicant: SENSATA TECHNOLOGIES, INC., Attleboro, MA (US)

(72) Inventors: Gerard Klaasse, Apeldoorn (NL); Robert Zwijze, Vriezenveen (NL); Robert Mckellar, Moira (GB); Shihong Huo, Bedford, MA (US); Jan-Willem Sloetjes, Wierden (NL)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 326 days.

(21) Appl. No.: 18/043,026

(22) PCT Filed: Sep. 29, 2021

(86) PCT No.: PCT/US2021/052555
§ 371 (c)(1),
(2) Date: Feb. 25, 2023

(87) PCT Pub. No.: WO2022/072428
PCT Pub. Date: Apr. 7, 2022

(65) Prior Publication Data
US 2024/0027292 A1 Jan. 25, 2024

Related U.S. Application Data

(60) Provisional application No. 63/084,650, filed on Sep. 29, 2020.

(51) Int. Cl.
*G01L 9/00* (2006.01)
(52) U.S. Cl.
CPC ................................. *G01L 9/0052* (2013.01)

(58) Field of Classification Search
None
See application file for complete search history.

(56) References Cited

U.S. PATENT DOCUMENTS 6,543,299 B2 * 4/2003 Taylor .................... G01L 1/205
73/862.046
6,789,430 B1 9/2004 Yoneda et al.
(Continued)

FOREIGN PATENT DOCUMENTS

| CN | 1809736 A | 7/2006 |
| CN | 101349602 A | 1/2009 |

(Continued)

OTHER PUBLICATIONS

International Search Report and Written Opinion, PCT/US2021/052555, Jan. 4, 2022, 13 pages.

*Primary Examiner* — Peter J Macchiarolo
*Assistant Examiner* — Jermaine L Jenkins
(74) *Attorney, Agent, or Firm* — Mark H. Williams

(57) ABSTRACT

Apparatuses that include a junction-isolated semiconductor strain gauge and methods for manufacturing a junction-isolated semiconductor strain gauge are disclosed. In a particular embodiment, an apparatus comprises a silicon chip that includes a silicon substrate and a semiconductor strain gauge. In this embodiment, the semiconductor strain gauge includes a plurality of resistors formed by locally doping the silicon substrate and biasing the silicon substrate such that the resistors of the plurality of resistors are junction-isolated. The silicon chip also includes a field shield layer to isolate an output signal of the semiconductor strain gauge from external electrical fields.

14 Claims, 4 Drawing Sheets

Top Surface
161

(56) References Cited

U.S. PATENT DOCUMENTS

| | | | |
|---|---|---|---|
| 10,221,062 | B2 | 3/2019 | Chiou et al. |
| 10,809,141 | B2 * | 10/2020 | Zhang ............... H01L 21/28167 |
| 11,965,789 | B2 * | 4/2024 | Suresh ................... A61B 34/30 |
| 2002/0003274 | A1 | 1/2002 | Bryzek et al. |
| 2004/0040382 | A1 | 3/2004 | Peterson et al. |
| 2012/0152029 | A1 | 6/2012 | Sato |
| 2016/0299025 | A1 | 10/2016 | Chen et al. |
| 2019/0145842 | A1 | 5/2019 | Zhang et al. |

FOREIGN PATENT DOCUMENTS

| | | | |
|---|---|---|---|
| CN | 103063339 | A | 4/2013 |
| CN | 105043609 | A | 11/2015 |
| CN | 106017750 | A | 10/2016 |
| CN | 106768517 | A | 5/2017 |
| CN | 207472465 | U | 6/2018 |
| EP | 1152232 | A1 | 11/2001 |
| JP | S5792870 | A | 6/1982 |
| JP | 10972805 | A | 3/1997 |

* cited by examiner

100

171

101

170

200

Voltage Source

JUNCTION-ISOLATED SEMICONDUCTOR STRAIN GAUGE

BACKGROUND

Semiconductor strain gauges are widely used through a variety of industries. For example, in the automotive industry, semiconductor strain gauges are used in pressure sensors for applications ranging from brake, transmission, and fuel pressure sensors to occupant weight force sensing. Such pressure sensors typically include silicon strain gauge elements which are glass-bonded to a diaphragm. Wheatstone bridges or other strain gauge configurations are sometimes employed to yield a linear voltage output which is directly proportional to the applied pressure on the diaphragm. The cost and ease of manufacture for these pressure sensors may depend in part on the fabrication method and the configuration of the components of the semiconductor strain gauge.

SUMMARY

Apparatuses that include a junction-isolated semiconductor strain gauge and methods for manufacturing a junction-isolated semiconductor strain gauge are disclosed. In a particular embodiment, an apparatus comprises a silicon chip that includes a silicon substrate and a semiconductor strain gauge. In this embodiment, the semiconductor strain gauge includes a plurality of resistors formed by locally doping the silicon substrate and biasing the silicon substrate such that the resistors of the plurality of resistors are junction-isolated. The silicon chip also includes a field shield layer to isolate an output signal of the semiconductor strain gauge from external electrical fields. As will be explained below, forming the resistors by locally doping a silicon substrate has many advantages over prior art designs. One of which is that a standard silicon wafer may be used for the substrate instead of a more costly custom substrate that is often required to manufacture semiconductor strain gauge in prior art designs. In addition, applying a field shield layer may have the advantage of isolating the resistors and improving performance of the semiconductor strain gauge.

In another embodiment, an apparatus is disclosed that includes a silicon chip having a silicon substrate and a junction-isolated semiconductor strain gauge. In this embodiment, the semiconductor strain gauge has a plurality of junction-isolated resistors. The plurality of resistors includes a first resistor electrically connected between a first bond pad and a second bond pad. The plurality of resistors also includes a second resistor electrically connected between the second bond pad and a third bond pad. In this example embodiment, the plurality of resistors includes a third resistor electrically connected between the third bond pad and a fourth bond pad. In this embodiment, the plurality of resistors includes a fourth resistor electrically connected between the fourth bond pad and the first bond pad. As will be explained below, the semiconductor strain gauge in this embodiment allows for a more minimized design. Minimizing the design of the semiconductor strain gauge may improve mechanical performance, reduce the negative effects of thermal gradients, and reduce the needed package size. Furthermore, a minimized design may also allow for the resistance of the semiconductor strain gauge to more easily be increased, which may be advantageous for low-power applications.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure.

Apparatuses that include a junction-isolated semiconductor strain gauge and methods for manufacturing a junction-isolated semiconductor strain gauge in accordance with the present disclosure are described with reference to the accompanying drawings, beginning with FIG. 1A. For further explanation, FIG. 1A, FIG. 1B, and FIG. 1C each illustrate different views of an apparatus 100 that includes a junction-isolated semiconductor strain gauge 101 on a silicon chip 103, according to at least one embodiment of the present invention.

Figure 1A:
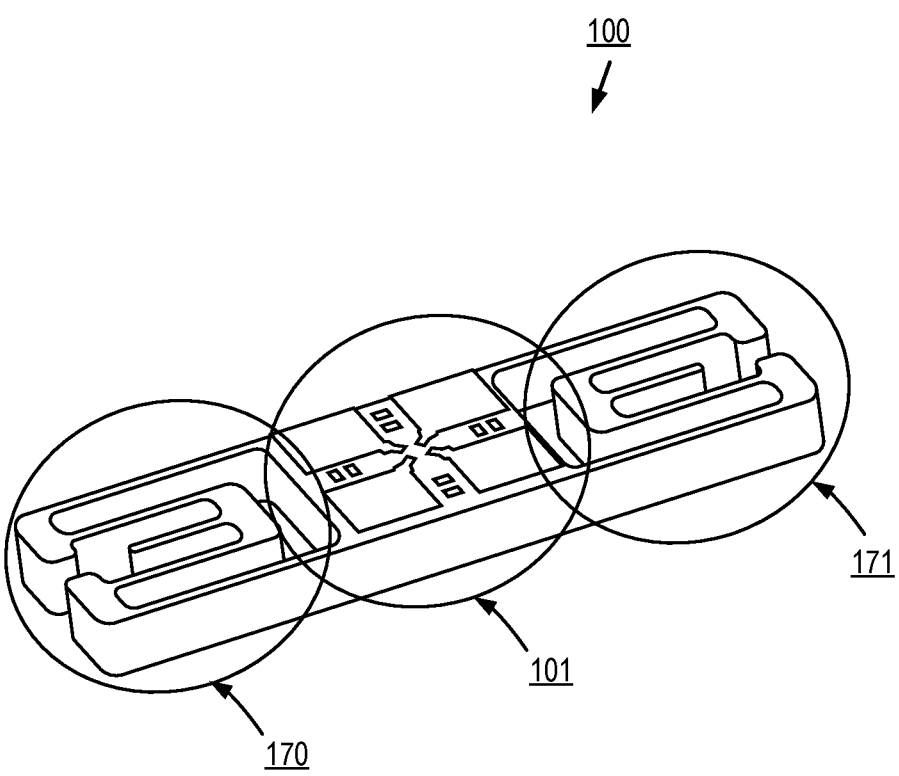
FIG. 1A illustrates an isometric view of an apparatus that includes a junction-isolated semiconductor strain gauge, according to at least one embodiment of the present invention.
Figures 1B, 1C:
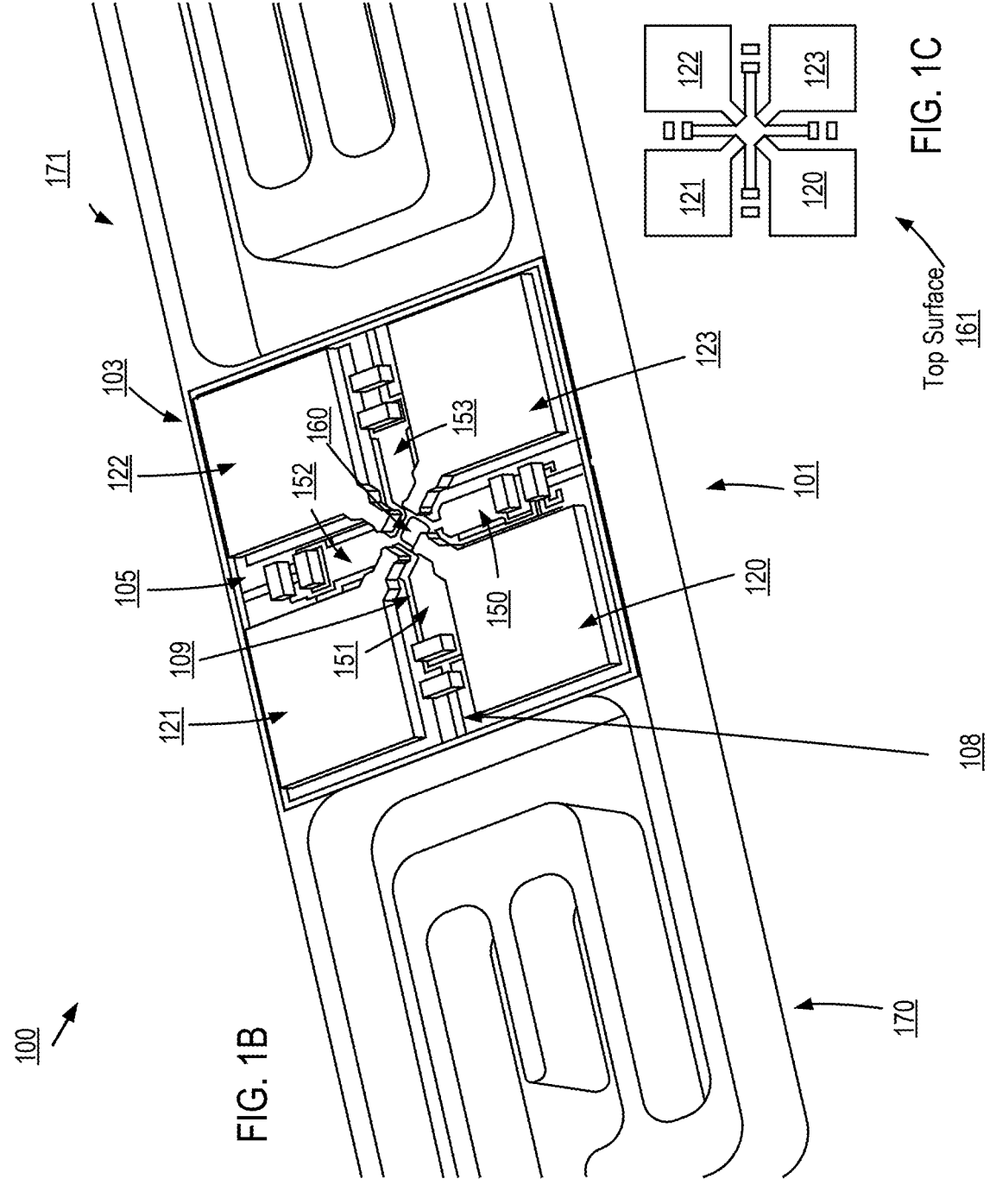
FIG. 1B illustrates a more detailed view of the apparatus of FIG. 1A.
FIG. 1C illustrates another view of a portion of the apparatus of FIG. 1A.

In the example of FIGS. 1A-C, the silicon chip 103 includes a silicon substrate 105 and the semiconductor strain gauge 101. In a particular embodiment, the silicon chip 103 may be affixed to the top of a diaphragm (not pictured), for example, by an adhesive or glass substrate layer. To monitor the pressure applied to the diaphragm, the semiconductor strain gauge 101 includes a number of sense elements, such as resistors or piezoresistive elements having a resistance that changes in conjunction with the flexing of the diaphragm. This resistance may be calculated, for example, by configuring the semiconductor strain gauge 101 and its components (resistors and bond pads) to form a configuration (e.g., a Wheatstone bridge) which works to generate a voltage output signal that may be relied upon to determine a resistance of one or more resistors of the semiconductor strain gauge 101. That is, in this embodiment, the linear voltage output of the semiconductor strain gauge 101 is directly proportional to the applied pressure on the diaphragm. For example, as pressure is applied to a diaphragm coupled to the semiconductor strain gauge 101, flexure of the diaphragm causes a change in resistance to one or more resistors of the semiconductor strain gauge 101. Continuing with this example, a constant voltage may be input into the semiconductor strain gauge 101, such that a change in resistance of one of the resistors will cause a corresponding change in an output voltage of the semiconductor strain gauge 101. The change in the output voltage may be used to calculate the amount of flexure in the diaphragm. As will be explained further below, the specific configuration of the semiconductor strain gauge 101 of FIGS. 1A-C may offer several advantages over prior art designs.

In the example of FIGS. 1A-C, the semiconductor strain gauge 101 has a plurality of resistors (a first resistor 150, a second resistor 151, a third resistor 152, and a fourth resistor 153) formed by locally doping the silicon substrate 105 and biasing the silicon substrate 105 such that the resistors are junction-isolated. In contrast to forming the resistors by locally doping the silicon substrate and biasing the silicon substrate, prior art designs may rely on forming the resistors by etching a uniformly doped silicon substrate. Because prior art designs often form resistors for a semiconductor strain gauge by etching a uniformly doped silicon substrate, these prior art designs may require special silicon substrates, which may be costly and many times difficult to source. However, forming the resistors by locally doping the silicon substrate 105 in accordance with embodiments of the present invention may allow for the use of industry standard silicon wafers, which are cheap and widely available, thus eliminating the need for these special silicon substrates. For example, a standard silicon wafer may be used for the silicon substrate 105 instead of a more costly custom substrate, as in prior art designs.

In addition to the advantage of using cheaper and easier to source materials, the semiconductor strain gauge 101 of FIGS. 1A-C may be also more compact and minimized than other prior art designs. Minimizing the design of the semiconductor strain gauge may improve mechanical performance, reduce the negative effects of thermal gradients, and reduce the needed package size. Furthermore, a minimized design may also allow for the resistance of the semiconductor strain gauge to more easily be increased, which may be advantageous for low-power applications.

To achieve this minimized design, the resistors of the semiconductor strain gauge 101 are positioned between the bond pads of the silicon chip. For example, the plurality of resistors of the semiconductor strain gauge 101 include the first resistor 150 electrically connected between a first bond pad 120 and a second bond pad 121. The plurality of resistors also include the second resistor 151 electrically connected between the second bond pad 121 and a third bond pad 122. In addition, the plurality of resistors also include the third resistor 152 electrically connected between the third bond pad 122 and a fourth bond pad 123. In this embodiment, the plurality of resistors also include the fourth resistor 153 electrically connected between the fourth bond pad 123 and the first bond pad 120.

In this example embodiment, the first resistor 150 is located on a top surface 161 of the silicon chip 103 between the first bond pad 120, the second bond pad 121, and the center 160 of the top surface 161 of the silicon chip 103. The second resistor 151 is located on the top surface 161 of the silicon chip 103 between the second bond pad 121, the third bond pad 122, and the center 160 of the top surface 161 of the silicon chip 103. In this example embodiment, the third resistor 152 is located on the top surface 161 of the silicon chip 103 between the third bond pad 122, the fourth bond pad 123, and the center 160 of the top surface 161 of the silicon chip 103. According to this embodiment, the fourth resistor 153 is located on the top surface 161 of the silicon chip 103 between the fourth bond pad 123, the first bond pad 120, and the center 160 of the top surface 161 of the silicon chip 103.

In the example of FIGS. 1A-C, the configuration of the resistors (i.e., the first resistor 150, the second resistor 151, the third resistor 152, and the fourth resistor 153) and the bond pads (i.e., the first bond pad 120, the second bond pad 121, the third bond pad 122, and the fourth bond pad 123) form a full Wheatstone bridge. Although the specific configuration of a four pad and two resistor configuration is illustrated in FIGS. 1A-C, other configurations are possible in accordance with one or more embodiments of the present invention. For example, a half-bridge configuration that has three pads and two resistors or a single resistor configuration with two pads and one resistor are also possible. In these alternative examples, the resistors may be positioned between the bond pads to minimize the design and a field shield layer may also be applied to isolate an output signal from electrical fields.

Figure 2:
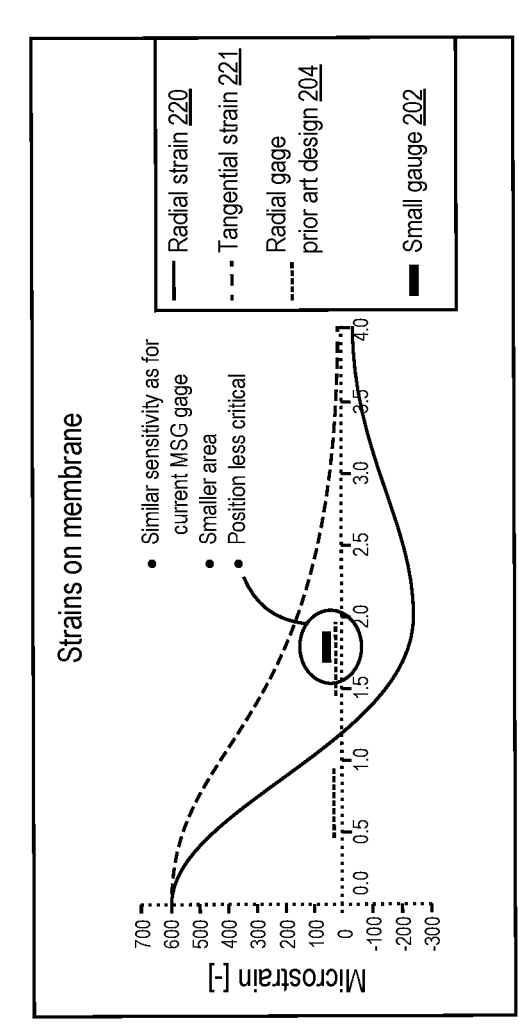
FIG. 2 illustrates a graph showing on a membrane, the location of a junction-isolated semiconductor strain gauge of FIG. 1, according to at least one embodiment of the present invention.

As explained above, this minimized design may allow for more flexible placement of the semiconductor strain gauge on a membrane to be monitored. For example, FIG. 2 illustrates a graph 200 showing on a membrane, the location 202 of a junction-isolated semiconductor strain gauge (also referenced as a "small gauge"), according to at least one embodiment of the present invention. The graph 200 also illustrates the radial strain 220 and the tangential strain 221 on the membrane. The locations 204 of a semiconductor strain gauge of a prior art design is also illustrated to demonstrate that the junction-isolated semiconductor strain gauge 101 has similar sensitivity as a prior art design but occupies a smaller area and the position of the semiconductor strain gauge is less critical than the semiconductor strain gauge of some prior art designs (e.g., the radial prior art gauge whose position on the membrane is shown in FIG. 2).

Returning back to FIGS. 1A-C, the silicon chip 103 is illustrated with a first set of tails 170 and a second set of tails 171 formed from a non-functioning part of the silicon substrate 105. In this example, the first set of tails 170 extends out in a direction from the center 160 of the top surface 161 of the silicon chip 103 and beyond the first bond pad 120 and the second bond pad 121. The second set of tails 171 extends out in a direction from the center 160 of the top surface 161 of the silicon chip 103 and beyond the third bond pad 122 and the fourth bond pad 123. In a particular embodiment, the tails 170, 171 may be removed.

The example embodiment of FIGS. 1A-C also illustrates the silicon chip 103 including junctions 109 surrounding each resistor of the plurality of resistors. In the example of FIGS. 1A-C, the silicon chip 103 includes a field shield layer 108 to isolate an output signal of the semiconductor strain gauge 101 from external electrical fields. Furthermore, the apparatus 100 may include a glass substrate (not pictured) for coupling the silicon substrate 105 to a contact surface (not pictured). According to this embodiment, the glass substrate is not in contact with the plurality of resistors of the semiconductor strain gauge 101. Because the glass substrate is not in contact with the sensing part of the semiconductor strain gauge, this design may have the advantage of eliminating output drift of the strain gauge due to ionic contamination in the glass substrate during various high temperature tests (so-called P2 drift), which may be experienced in prior art designs that couple the glass substrate to the sensing elements of the semiconductor strain gauge.

Figure 3:
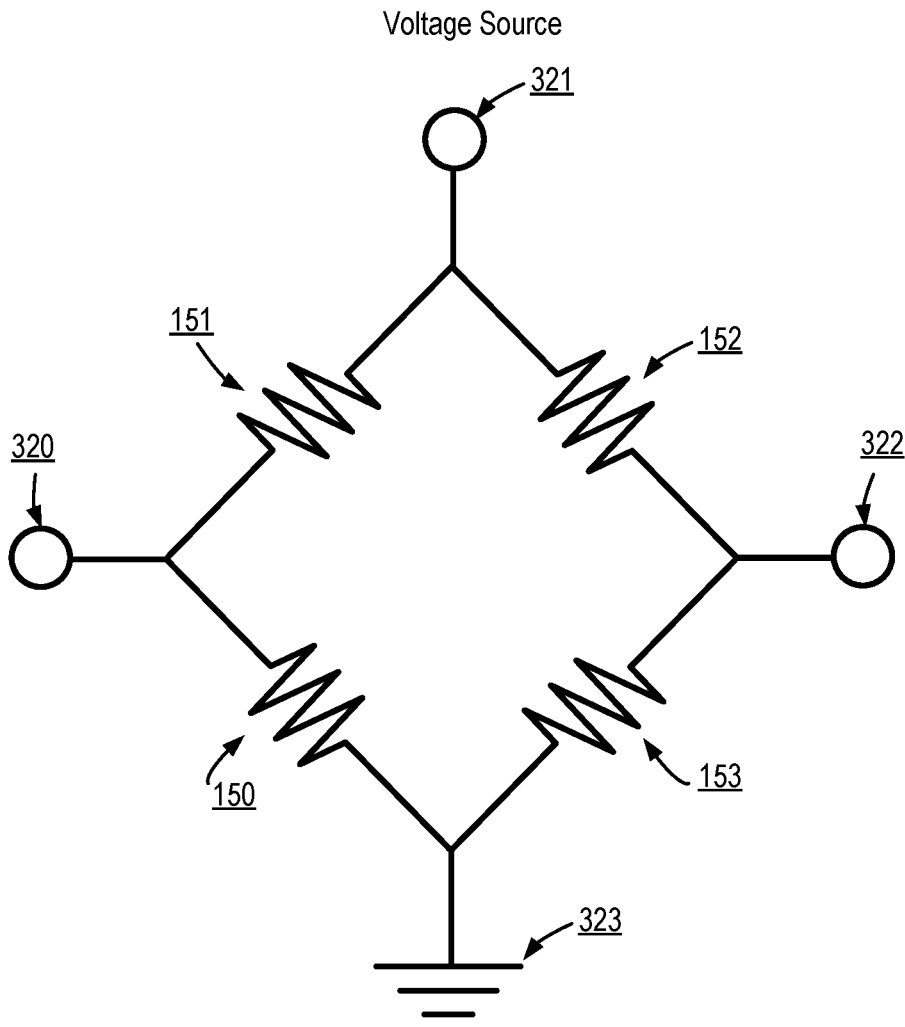
FIG. 3 illustrates a simplified circuit diagram of the junction-isolated semiconductor strain gauge of FIG. 1A.

For further explanation, FIG. 3 illustrates a simplified circuit diagram of the junction-isolated semiconductor strain gauge 101 of FIG. 1A. As explained above, in the example of FIG. 1A, the resistors (150, 151, 152, 153) of the junction-isolated semiconductor strain gauge 101 form a first Wheatstone bridge. Those of ordinary skill in the electrical arts know that a Wheatstone bridge circuit has two input nodes and two output nodes. The output voltage of a Wheatstone bridge will change as the resistors' values change induced by pressure, temperature change, thermal mismatch, etc. In the example of FIG. 3, a voltage source may be applied to the bridge configuration circuit at a second terminal 321 along with a connection to ground at a fourth terminal 323. In a particular embodiment, the two outputs of the circuit at a first terminal 320 and a terminal lead 322 are proportionally correlated to the voltage variation of these resistors' resistance change.

In the example of FIG. 3, the voltage at the first terminal (320) and the third terminal (322) may form the output associated with the semiconductor strain gauge (101). In operation, the resistance of the semiconductor strain gauges (101) may change based on the amount of pressure on a diaphragm coupled to the semiconductor strain gauge (101). By measuring the voltage difference between the first terminal (320) and the third terminal (322), one can determine the resistance of the semiconductor strain gauge (101). It should be understood that FIG. 3 merely illustrates an example configuration of the circuitry and readers of skill in the art will realize that other configurations may be used.

The figures and designs disclosed offer multiple performance and cost-reduction benefits including the following The solder glass of the MSH sensor is no longer in contact with the sensing part of the silicon, which will eliminate the failure mode where ionic contamination in the glass causes output drift during various high temperature tests (so-called P2 drift).

The design of the strain gauges can be minimized, which improves the mechanical performance, reduces the negative effects of thermal gradients, and reduces the package size capabilities.

With minimized designs, it is much easier to increase the bridge resistance, which is critical for low-power applications.

The flowchart and block diagrams in the Figures illustrate the architecture, functionality, and operation of possible implementations of systems, apparatuses, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Advantages and features of the present disclosure can be further described by the following statements:

1. An apparatus comprising: a silicon chip that includes a silicon substrate and a semiconductor strain gauge, the semiconductor strain gauge having a plurality of resistors formed by locally doping the silicon substrate and biasing the silicon substrate such that the resistors of the plurality of resistors are junction-isolated; and a field shield layer to isolate an output signal of the semiconductor strain gauge from external electrical fields.

2. The apparatus of statement 1 the plurality of resistors including a first resistor electrically connected between a first bond pad and a second bond pad; a second resistor electrically connected between the second bond pad and a third bond pad; a third resistor electrically connected between the third bond pad and a fourth bond pad; and a fourth resistor electrically connected between the fourth bond pad and the first bond pad.

3. The apparatus of statement 1 or 2 further comprising junctions surrounding each resistor of the plurality of resistors.

4. The apparatus of any of statements 1-3, wherein the first resistor is located on a top surface of the silicon chip between the first bond pad, the second bond pad, and the center of the top surface of the silicon chip; wherein the second resistor is located on the top surface of the silicon chip between the second bond pad, the third bond pad, and the center of the top surface of the silicon chip; wherein the third resistor is located on the top surface of the silicon chip between the third bond pad, the fourth bond pad, and the center of the top surface of the silicon chip; and wherein the fourth resistor is located on the top surface of the silicon chip between the fourth bond pad, the first bond pad, and the center of the top surface of the silicon chip.

5. The apparatus of any of statements 1-4, wherein the silicon chip includes: a first set of tails formed from the silicon substrate, the first set of tails extending out in a direction from the center of the top surface of the silicon chip and beyond the first bond pad and the second bond pad; and a second set of tails formed from the silicon substrate, the second set of tails extending out in a direction from the center of the top surface of the silicon chip and beyond the third bond pad and the fourth bond pad.

6. The apparatus of any of statements 1-5, wherein each resistor of the plurality of resistors is a piezoresistive resistor.

7. The apparatus of any of statements 1-6 further comprising a glass substrate for coupling the silicon substrate to a contact surface.

8. The apparatus of any of statements 1-7, wherein the glass substrate is not in contact with the plurality of resistors.

9. The apparatus of any of statements 1-8, wherein the silicon substrate is formed from a silicon wafer.

10. An apparatus comprising: a silicon chip that includes a silicon substrate and a semiconductor strain gauge, the semiconductor strain gauge having a plurality of junction-isolated resistors, the plurality of resistors including a first resistor electrically connected between a first bond pad and a second bond pad; a second resistor electrically connected between the second bond pad and a third bond pad; a third resistor electrically connected between the third bond pad and a fourth bond pad; and a fourth resistor electrically connected between the fourth bond pad and the first bond pad.

11. The apparatus of statement 10 further comprising a field shield layer to isolate an output signal of the semiconductor strain gauge from external electrical fields.

12. The apparatus of any of statements 10-11, wherein the plurality of resistors are formed by locally doping the silicon substrate and biasing the silicon substrate such that the resistors are junction-isolated.

13. The apparatus of any of statements 10-12 further comprising junctions surrounding each resistor of the plurality of resistors.

14. The apparatus of any of statements 10-13, wherein the first resistor is located on the top surface of the silicon chip between the first bond pad, the second bond pad, and the center of the top surface of the silicon chip; wherein the second resistor is located on the top surface of the silicon chip between the second bond pad, the third bond pad, and the center of the top surface of the silicon chip; wherein the third resistor is located on the top surface of the silicon chip between the third bond pad, the fourth bond pad, and the center of the top surface of the silicon chip; and wherein the fourth resistor is located on the top surface of the silicon chip between the fourth bond pad, the first bond pad, and the center of the top surface of the silicon chip.

15. The apparatus of any of statements 10-14, wherein the silicon chip includes: a first set of tails formed from the silicon substrate, the first set of tails extending out in a direction from the center of the top surface of the silicon chip and beyond the first bond pad and the second bond pad; and a second set of tails formed from the silicon substrate, the second set of tails extending out in a direction from the center of the top surface of the silicon chip and beyond the third bond pad and the fourth bond pad.

16. The apparatus of any of statements 10-15, wherein each resistor of the plurality of resistors is a piezoresistive resistor.

17. The apparatus of any of statements 10-16 further comprising a glass substrate for coupling the silicon substrate to a contact surface.

18. The apparatus of any of statements 10-17, wherein the glass substrate is not in contact with the plurality of resistors.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. An apparatus comprising:

a silicon chip that includes a silicon substrate and a semiconductor strain gauge, the semiconductor strain gauge having a plurality of resistors formed by locally doping the silicon substrate and biasing the silicon substrate such that the resistors of the plurality of resistors are junction-isolated; and a field shield layer to isolate an output signal of the semiconductor strain gauge from external electrical fields;

wherein the plurality of resistors including:

a first resistor electrically connected between a first bond pad and a second bond pad;

a second resistor electrically connected between the second bond pad and a third bond pad;

a third resistor electrically connected between the third bond pad and a fourth bond pad; and a fourth resistor electrically connected between the fourth bond pad and the first bond pad;

wherein the silicon chip includes:

a first set of tails formed from the silicon substrate, the first set of tails extending out in a direction from the center of a top surface of the silicon chip and beyond the first bond pad and the second bond pad; and a second set of tails formed from the silicon substrate, the second set of tails extending out in a direction from the center of the top surface of the silicon chip and beyond the third bond pad and the fourth bond pad.

2. The apparatus of claim 1 further comprising junctions surrounding each resistor of the plurality of resistors.

3. The apparatus of claim 1, wherein the first resistor is located on the top surface of the silicon chip between the first bond pad, the second bond pad, and the center of the top surface of the silicon chip;

wherein the second resistor is located on the top surface of the silicon chip between the second bond pad, the third bond pad, and the center of the top surface of the silicon chip;

wherein the third resistor is located on the top surface of the silicon chip between the third bond pad, the fourth bond pad, and the center of the top surface of the silicon chip; and wherein the fourth resistor is located on the top surface of the silicon chip between the fourth bond pad, the first bond pad, and the center of the top surface of the silicon chip.

4. The apparatus of claim 1 wherein each resistor of the plurality of resistors is a piezoresistive resistor.

5. The apparatus of claim 1 further comprising a glass substrate for coupling the silicon substrate to a contact surface.

6. The apparatus of claim 5 wherein the glass substrate is not in contact with the plurality of resistors.

7. The apparatus of claim 1 wherein the silicon substrate is formed from a silicon wafer.

8. An apparatus comprising:

a silicon chip that includes a silicon substrate and a semiconductor strain gauge, the semiconductor strain gauge having a plurality of junction-isolated resistors, the plurality of resistors including a first resistor electrically connected between a first bond pad and a second bond pad;

a second resistor electrically connected between the second bond pad and a third bond pad;

a third resistor electrically connected between the third bond pad and a fourth bond pad; and a fourth resistor electrically connected between the fourth bond pad and the first bond pad;

wherein the plurality of resistors are formed by locally doping the silicon substrate and biasing the silicon substrate such that the resistors are junction-isolated;

wherein the first resistor is located on a top surface of the silicon chip between the first bond pad, the second bond pad, and the center of the top surface of the silicon chip;

wherein the second resistor is located on the top surface of the silicon chip between the second bond pad, the third bond pad, and the center of the top surface of the silicon chip;

wherein the third resistor is located on the top surface of the silicon chip between the third bond pad, the fourth bond pad, and the center of the top surface of the silicon chip; and wherein the fourth resistor is located on the top surface of the silicon chip between the fourth bond pad, the first bond pad, and the center of the top surface of the silicon chip.

9. The apparatus of claim 8 further comprising a field shield layer to isolate an output signal of the semiconductor strain gauge from external electrical fields.

10. The apparatus of claim 8 further comprising junctions surrounding each resistor of the plurality of resistors.

11. The apparatus of claim 8 wherein the silicon chip includes:

a first set of tails formed from the silicon substrate, the first set of tails extending out in a direction from the center of the top surface of the silicon chip and beyond the first bond pad and the second bond pad; and a second set of tails formed from the silicon substrate, the second set of tails extending out in a direction from the center of the top surface of the silicon chip and beyond the third bond pad and the fourth bond pad.

12. The apparatus of claim 8 wherein each resistor of the plurality of resistors is a piezoresistive resistor.

13. The apparatus of claim 8 further comprising a glass substrate for coupling the silicon substrate to a contact surface.

14. The apparatus of claim 13 wherein the glass substrate is not in contact with the plurality of resistors.

* * * * *